United States Patent

Gillingham et al.

[11] Patent Number: 5,116,083
[45] Date of Patent: May 26, 1992

[54] CLAMP FOR COUPLING AND SEALING PIPE JOINTS

[75] Inventors: Gary R. Gillingham, Prior Lake; Wayne M. Wagner, Apple Valley; Fred H. Wahlquist, Bloomington, all of Minn.

[73] Assignee: Donaldson Company, Inc., Minneapolis, Minn.

[21] Appl. No.: 506,594

[22] Filed: Apr. 9, 1990

Related U.S. Application Data

[63] Continuation of Ser. No. 228,760, Aug. 4, 1988, abandoned.

[51] Int. Cl.⁵ .............................................. F16L 55/00
[52] U.S. Cl. ............................... 285/23; 285/177; 285/373; 285/424; 285/420
[58] Field of Search ............... 285/23, 373, 419, 420, 285/424; 138/94; 24/279

[56] References Cited

U.S. PATENT DOCUMENTS

| | | |
|---|---|---|
| 848,139 | 3/1907 | Stuppar . |
| 973,466 | 10/1910 | Beegen . |
| 1,146,813 | 7/1915 | Peterman et al. . |
| 2,227,551 | 1/1941 | Morris . |
| 2,998,629 | 9/1961 | Smith . |
| 3,004,781 | 10/1961 | Morris . |
| 4,261,600 | 4/1981 | Cassel ................................. 285/420 |
| 4,365,392 | 12/1982 | Heckethorn ....................... 285/420 |
| 4,558,891 | 12/1985 | Wagner et al. ..................... 285/420 |
| 4,790,574 | 12/1988 | Wagner . |

*Primary Examiner*—Dave W. Arola
*Attorney, Agent, or Firm*—Merchant, Gould, Smith, Edell, Welter & Schmidt

[57] ABSTRACT

A clamp suitable for joining a pair of tubular members such as truck exhaust pipes including a metal band having a reinforcing bar at each end wrapped more than one turn, each wrapped reinforced end forming at least one hold for receiving, threading, and securing a set of bolts and nuts. The band is preferably formed from an aluminized steel, and the reinforcing bars may be non-plated. Embodiments using only the wrapped ends without reinforcing bars, folded rims, beading, and bolt-securing plates are also disclosed.

8 Claims, 7 Drawing Sheets

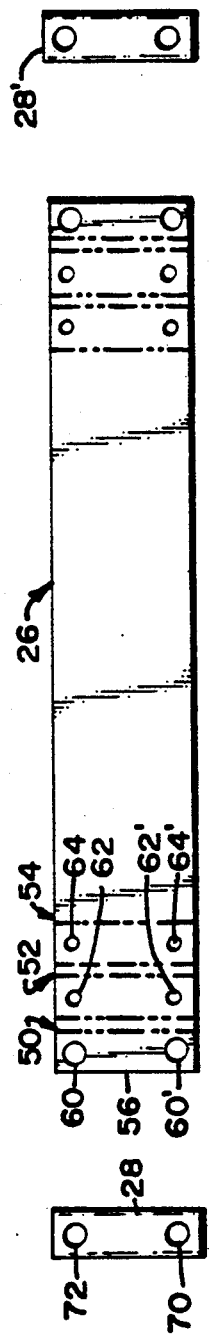
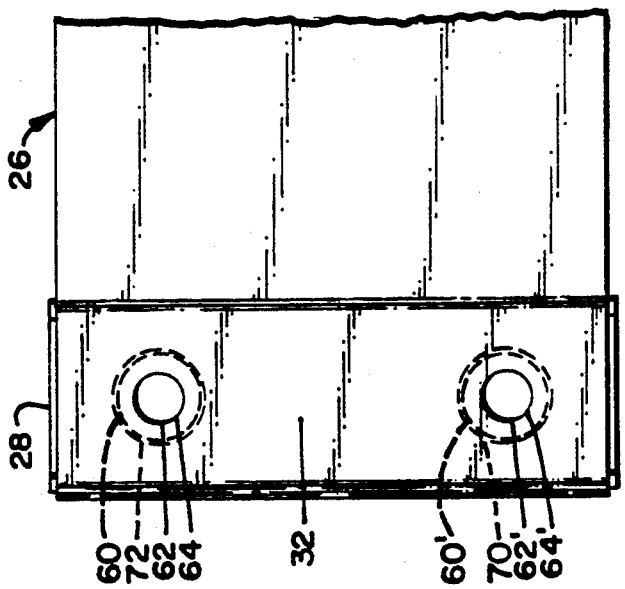
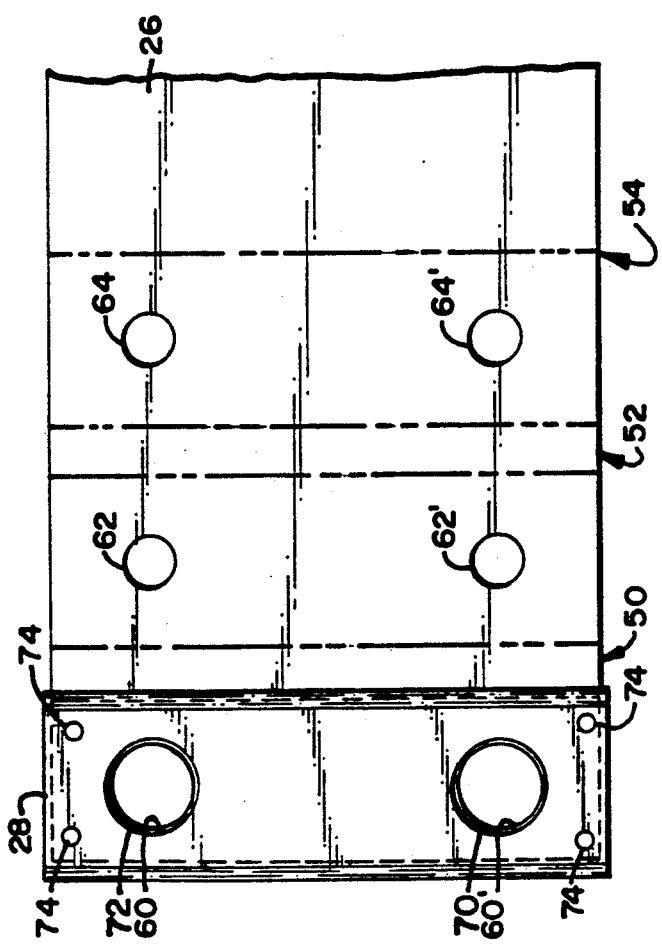

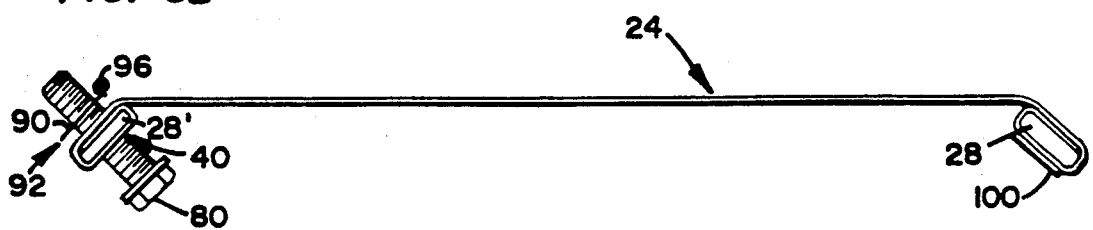
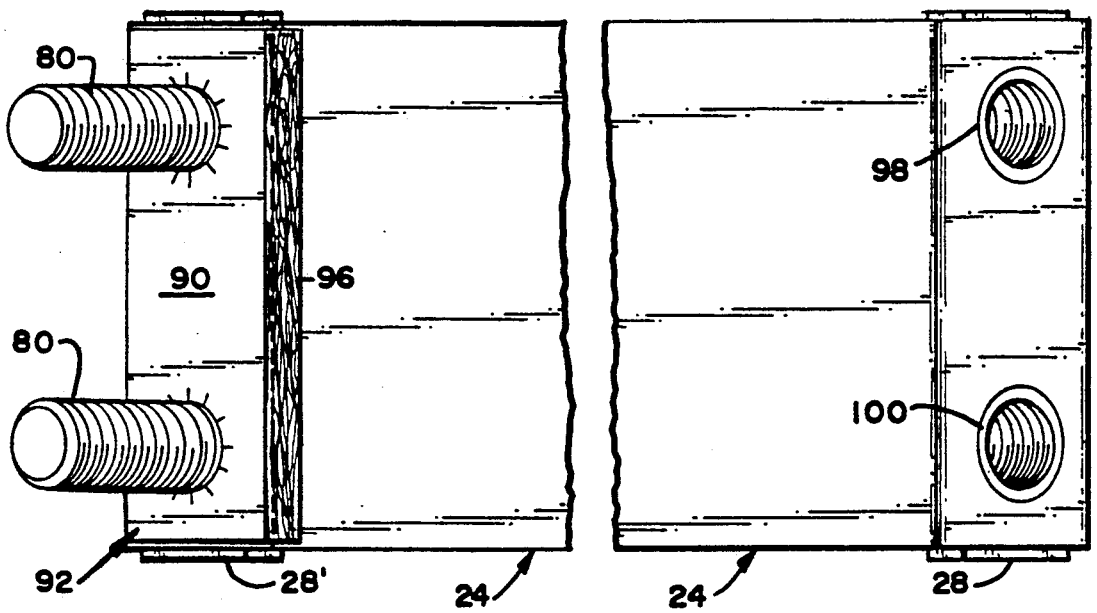
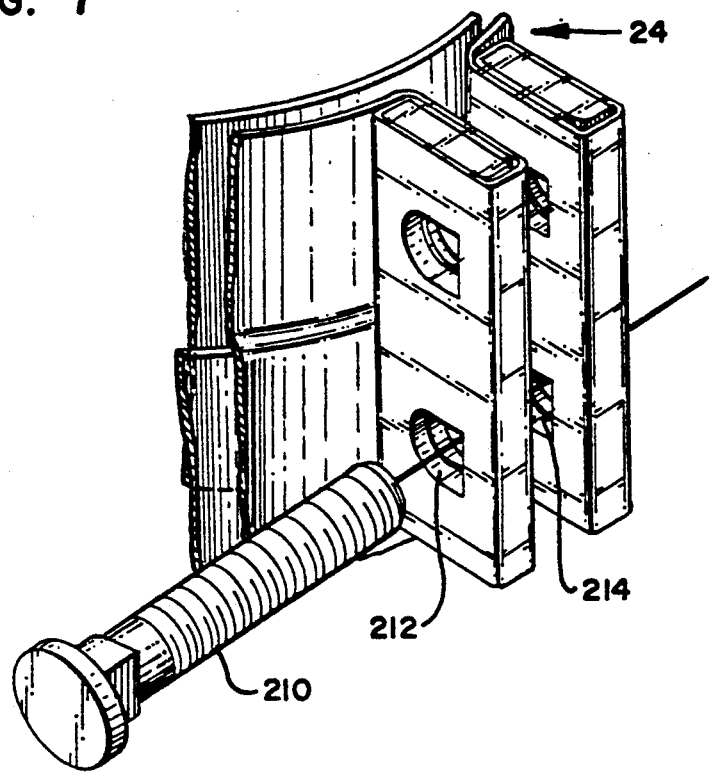

CLAMP FOR COUPLING AND SEALING PIPE JOINTS

This is a continuation, of application Ser. No. 228,760, filed Aug. 4, 1988 now abandoned.

FIELD OF THE INVENTION

This invention relates to the field of connectors, and more particularly, to a method and apparatus for using metal bands to join tubular conduits in end-to-end relation to form a sealing joint.

BACKGROUND OF THE INVENTION

Fairly effective clamps for joining and sealing tubular conduits such as truck exhaust pipes in end-to-end relation using stretchable metal bands are known. For example, U.S. Pat. No. Re 30,042, owned by the assignee herein, discloses a method and apparatus for joining two tubular members using a band of ductile metal passed around the ends of the tubular members and circumferentially stretched beyond its elastic limit to conform with the outer surfaces of the members throughout practically their entire circumferences. Other structures using ductile metal bands are known, for example, in the Cassell U.S. Pat. No. 3,905,623. One embodiment of the Hiemstra patent is shown in FIG. 1 as comprising a metal band 10 welded to reinforcing bars at each end at spot welds 16 and 16'. Holes for threading a nut and bolt through the metal band and reinforcing bars when the apparatus is wrapped around the tubular members where pipes to be joined are shown at 18 and 18'.

Typically, the existing metal band-type clamps will use a fairly high-quality metal such as a stainless steel, e.g. 304 SS ductile strap. Aluminized steel is also used, but currently is used primarily as part of a prestretched, curved clamp. Using 304 stainless steel has the advantages of resisting corrosion, being securely weldable to reinforcing bars, and having sufficient ductility to withstand elongation before tearing or breaking. A less ductile metal band may tear or break under the stress applied to the metal band when the band is wrapped around the tubular members and circumferentially stretched to form a coupling and sealing joint. The reinforcing bars are typically made of plated metal to withstand corrosion on the exposed surfaces of the bar in use. Moreover, the reinforcing bar must also be capable of being securely welded to the metal band.

Metals having a lower tolerance than stainless steel for elongation or stretching before ripping or breaking are commonly available. Metals other than stainless steel are available which are non-corroding. Some of these metals are not capable of being welded as readily as stainless steel. Moreover, reinforcing bars are available which are not plated but are more susceptible to corrosion. However, use of these materials has the advantage of reducing material costs in many instances.

In manufacturing and using the metal band-type pipe joints, it is desirable to reduce the stress on the clamp to allow use of lower cost materials. Reductions in stress are particularly important in the region where the clamp is joined together, since this is one of the higher stress regions of the clamp. It is also desirable to strengthen the clamp in its high-stress areas, again including the region where the clamp is joined together. Moreover, it would be advantageous to save or reduce the labor required in manufacturing the metal band-type clamps, such as by eliminating or reducing the amount of welding necessary. It is also desirable to reduce or eliminate opportunities for corrosion of the clamp or to enable the use of materials which are of a lower cost due to a lack of plating or other corrosion preventatives. It is further desirable to accomplish these objectives in an aesthetically pleasing structure which can be made in an economical way.

SUMMARY OF THE INVENTION

A method for making a metal band-type clamp or connector according to the present invention comprises the steps of obtaining a substantially rectangular metal band such as aluminized steel having a length longer than the circumference of the tubular members to be joined; obtaining a pair of substantially rectangular reinforcing bars having a longitudinal length approximately equal to or greater than the width of the metal band; placing each reinforcing bar across the metal band width at each end of the metal band; wrapping the metal band approximately one and one-half turns around each reinforcing bar; and punching or otherwise forming at least one hole through each of the two wrapped ends of the metal band and the reinforcing bars enclosed within the metal band wrappings. Also disclosed is a method of forming each hole in each end of the metal band which includes punching, prepunching, or prefabricating a set of holes in the metal band of a diameter smaller than the diameter of the bolts to be inserted in the holes to be formed and forming each hole in the reinforcing bars by bending the portion of the metal band which overhangs the holes in the reinforcing bars into the holes formed by reinforcing bars. When the steps are completed, the holes in the reinforcing bars will be at least partially lined with the metal band material. This method may be used with little or no welding.

An apparatus according to the invention is described comprising a metal band wrapped at each end around a reinforcing bar and having at least one hole in each wrapped end. The metal band may be an aluminized steel, while the reinforcing bar may be nonplated steel. Other variations of the apparatus are described, including a metal band having wrapped ends comprising multiple layers of the metal band and no reinforcing bar at all. Also disclosed are embodiments including at least one nut inserted into one end of the band with each bolt secured in place at the other end by a plate aligned with the reinforcing bar.

Various features and advantages of the methods and apparatuses summarized above are pointed out with particularity in the description of the preferred embodiments and the claims as well as the drawings.

DESCRIPTION OF THE DRAWING

FIG. 4A is a side elevational view of the metal band and a reinforcing bar prior to wrapping to form the clamp;

FIGS. 4B and 4C are side elevational views of the meal band clamp during and after wrapping and before forming of the holes;

FIGS. 6B and 6C are top plan and side elevational views of a metal band clamp having a bolt-securing plate;

FIG. 7 is a perspective view of modifications of the present invention including a D-bolt;

DESCRIPTION OF THE PREFERRED EMBODIMENTS

Figure 1:
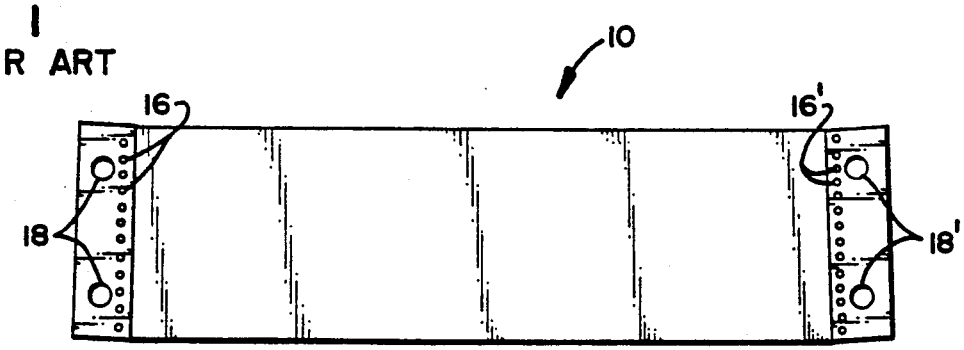
FIG. 1 shows a side elevational view of a prior art ductile metal band clamp prior to use.
Figure 2A:
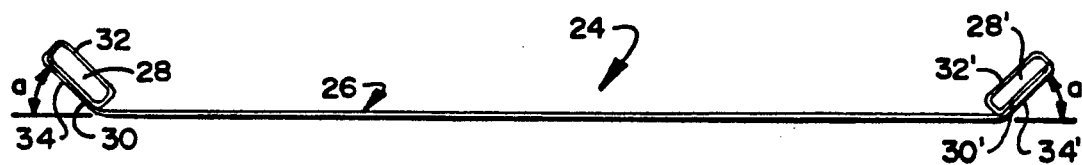
FIG. 2A shows a top plan view of a metal clamp in accordance with the present invention prior to use.
Figure 2B:
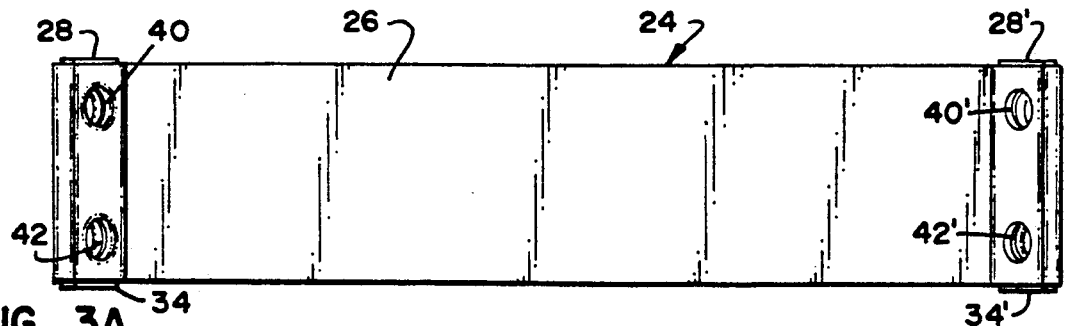
FIG. 2B shows a side elevational view of the clamp of FIG. 2A prior to use.

FIGS. 2A and 2B show a metal band-type clamp according to the present invention. The clamp 24 includes metal band 26 and reinforcing bars 28 and 28'. The metal band is wrapped around the bars at wrappings 30, 32, and 34 and 30', 32' and 34'. A one-and-a-half wrap around each reinforcing bar is shown. However, it is within the scope of the invention to wrap the reinforcing bars a greater or lesser number of times. The clamp has two pairs of holes 40, 42 and 40' and 42', one pair at each end, for receiving securing bolts.

The band 26 may be fabricated from ductile materials such as type 304 stainless steel, but may also be fabricated from other materials such as aluminized steel. While less ductile commercial quality aluminized steel may be used for some applications, an aluminized steel of drawing quality is preferred. The aluminized steel may have a lower yield point than a stainless steel. The typical dimensions of such clamps are well-known and are not described herein.

The reinforcing bars 28 and 28' may be plated to prevent corrosion. However, in the preferred embodiment of the invention the reinforcing bars need not be plated or otherwise protected from corrosion due to protection provided by the band wrapping. Also, most corrosion which may occur will not be as visible due to the band. In the preferred embodiment, the portion of the metal band which wraps around the reinforcing bars is bent at an angle a from the central portion of the metal band, as shown in FIG. 2A. This angle is a preferably approximately 45 degrees, easing the installation of the clamp while preserving stackability and conserving space while stacking. Other angles may also serve these purposes, although it is preferable that the angle a be less than 90 degrees.

Figure 3A:
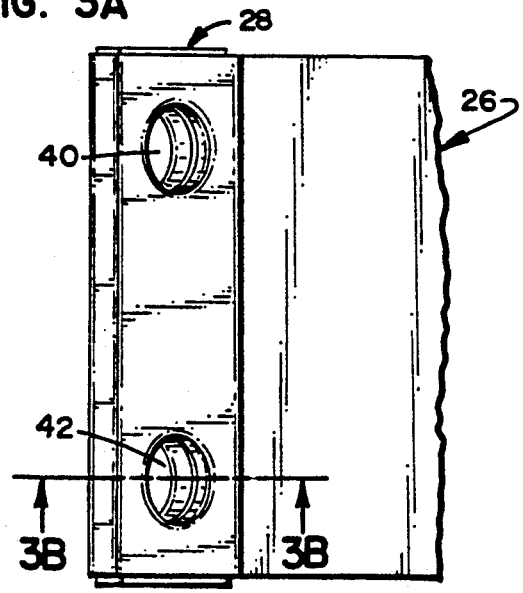
FIG. 3A shows an enlarged side elevational view of a reinforced end of the clamp of FIG. 2B.
Figure 3B:
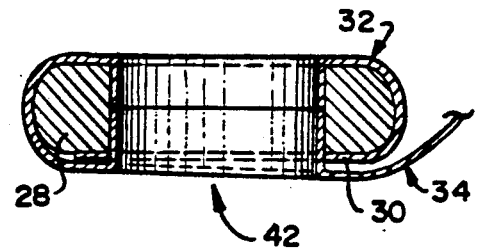
FIG. 3B shows an enlarged side view of the cross section marked in FIG. 3A.
Figure 12A:
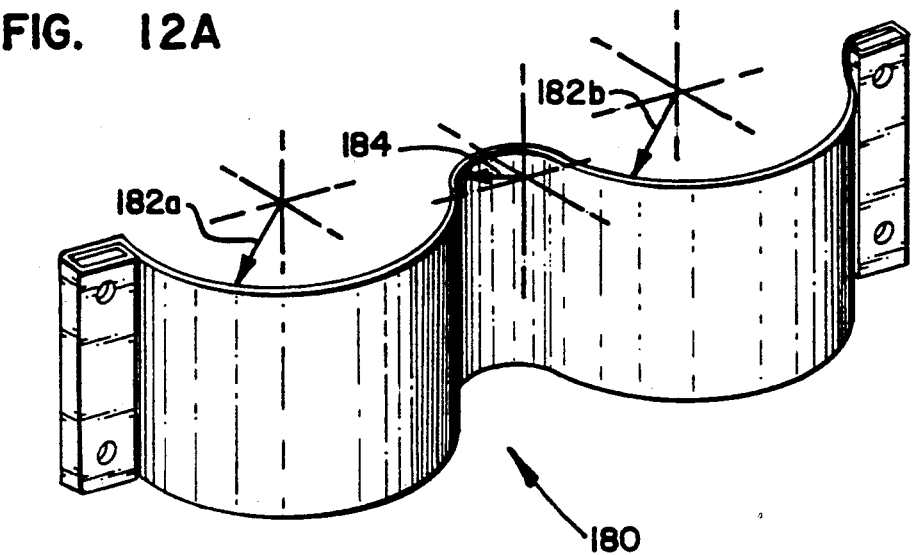
FIGS. 12A and 12B are a side perspective view and a top plan view of an alternative embodiment of a metal clamp in accordance with the present invention.
Figure 12B:
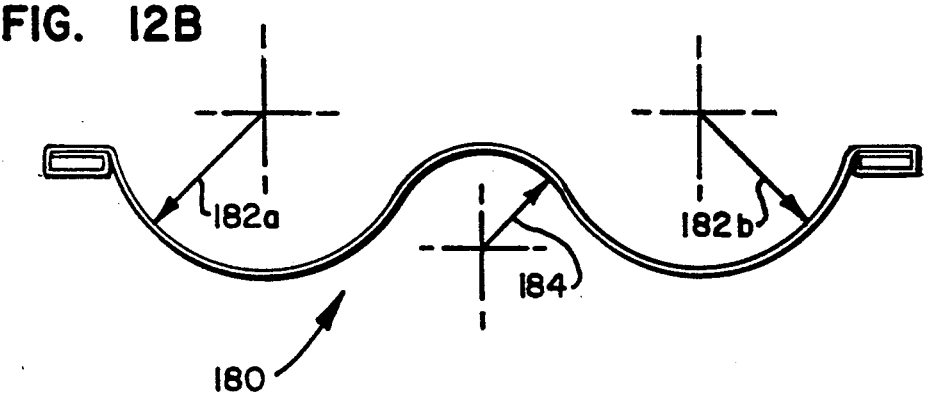

The clamp may be preformed for fitting around pipes to be joined, as shown in FIGS. 12A and 12B. Such preforming further eases installation An enlargement of the wrapped ends of the metal band is shown in FIGS. 3A, and 3B. FIG. 3A shows a portion of the metal band 26 near one end wrapping reinforcing bar 28. Also shown are holes 40 and 42. A cross section of this wrapped section of the band, identified in FIG. 3A, is shown in FIG. 3B. FIG. 3B shows the reinforcing bar 28 having hole 42 punched therethrough or equivalently formed in cross section as labeled in FIG. 3A. The wrapped layers of metal band 26 are shown as half wraps 30, 32, and 34. Wraps 32 and 34 are shown as formed into the holes, providing a smooth rim to the holes punched or equivalently formed. This forming improves the appearance of the clamp as well as protects the punched portions of the reinforcing bars from corrosion. The forming also protects the bolts to be inserted through the holes from damage due to burrs or other imperfections along the edges of the reinforcing bar.

Several option exist with respect to lining the holes with the metal band. One option is to form layers 30, 34 into 42 from one side of hole 42, and form layer 32 into the other side of hole 42. This option forms the greatest volume of lining in the hole. A second option is to form only outer layer 30 of the double-layer side of hole 42 into the hole. A third option includes the second option, plus forming layer 32 of the single-layer side into the hole. The second option is preferred in some applications, providing most of the benefits of the other options but with a reduced number of steps.

Moreover, the metal band layers may be formed into the holes around the entire circumference of the holes, or around some portion of the hole such as 180° around. Forming the layers around the entire circumference is preferred.

The forming of the metal band into the hole punched in the reinforcing bar provides other advantages as well. The action holds the reinforcing bar in a virtually fixed position relative to the metal band, reducing or eliminating the need for welding or otherwise fixing the reinforcing bar to the metal band prior to installation. Moreover, the wrapping and forming provide additional layers of metal band at areas near the holes formed by the wand and reinforcing bars. This additional metal will strengthen the clamp at the high-stress areas located adjacent to the holes. Moreover, some slack may be provided in the wraps of the metal band as wrapped around the reinforcing bar to allow the stress applied to the wrapped region to be distributed throughout a greater length of the wrapped portion of the metal band rather than concentrated in wrapping section 34. The lining of the holes with the metal band improves the appearance of the clamp as well.

In the embodiment described in the above-referenced drawings, virtually the only portions of the reinforcing bars 28 and 28' which are not covered by the ductile metal band are the ends of the bars. Thus, the reinforcing bars have reduced susceptibility to corrosion and the need for plating to prevent damaging corrosion is reduced or eliminated. Moreover, the wrapping of the reinforcing bars also covers any corrosion of the reinforcing bars from view, further improving the appearance of the clamp.

The metal band need not be welded to the reinforcing bars. Alternatively, limited welding may be used sufficient to tack the reinforcing bar in place before wrapping, in order to position the reinforcing bar.

A method for producing a clamp as shown in Figs. 2A and 2B is now described with reference to Figs.

4A–4C. FIG. 4A shows the metal band 26 which is to be wrapped around reinforcing bars 28 and 28'. Dashed lines 50, 52, and 54 represent the approximate folding points of the band around the reinforcing bar to form the one-and-a-half turn wrap described as the preferred embodiment.

FIG. 4A shows hole pairs 60/60', 62/62', and 64/64' formed at one end of the metal band. The other end of the metal band has a similar set of holes. Holes 60/60' have diameters approximately equal to the diameter of the reinforcing bar holes 70 and 72. Holes 62, 62', 64 and 64' have diameters equal to each other but slightly smaller than holes 60, 60', 70, and 72. The holes are positioned such that holes 72, 60, 62 and 64 are centered over each other when the metal band 26 is wrapped around reinforcing bar 28. Holes 70, 60', 62', and 64' are similarly positioned relative to each other. With the dimensions described, the reinforcing bar holes will be lined with the portions of the metal band adjacent to holes 62, 62', 64, and 64'. However, alternative embodiments may increase the diameter of holes 62/62' or 64/64' to reduce the amount of lining of the reinforcing bar holes. Alternatively, the lining may be increased by reducing the diameter of holes 60/60'.

To form the clamp, reinforcing bar 28 is aligned at the section of the end of the metal band formed by edge 56 and dotted line 50. The reinforcing bar is approximately centered along this edge as shown. Although not necessary, in the preferred embodiment, the reinforcing bar is tacked to the metal band, such as by spot welds 74. Whether such welds are used or not, the wrapping feature of the clamp reduces or eliminates the stress on such welds, which in prior art embodiments create high-stress areas. Thus, the welds become optional to aid fabrication and are not necessary for proper clamp function. The reinforcing bar, as attached to the metal band, is wrapped one-and-one-half times into the metal band as shown in FIG. 3B. FIG. 4C also shows holes 60, 62 and 64 aligned and centered over hole 72 and holes 60', 62' and 64' aligned and centered over hole 70. It is noted that holes 70 and 72 are ideally punched in the reinforcing bar prior to wrapping. The portions of the metal bands surrounding holes 62/62' and 64/64' are ideally formed into each hole by a punching process. After wrapping, the holes are formed to form lined holes 40 and 42 as shown in FIGS. 3A and 3B.

Figure 5A:
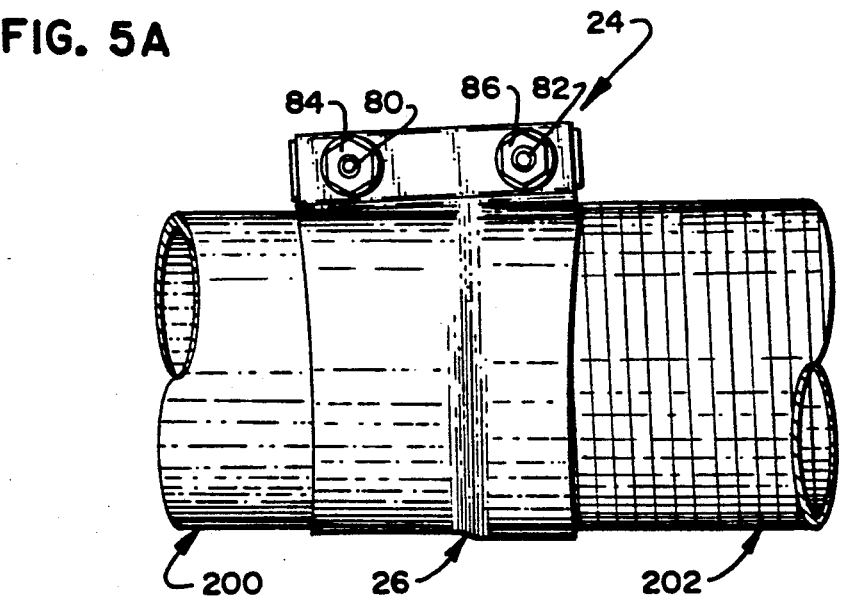
FIGS. 5A and 5B are side and enlarged edge views of a metal band clamp in accordance with the present invention as installed.
Figure 5B:
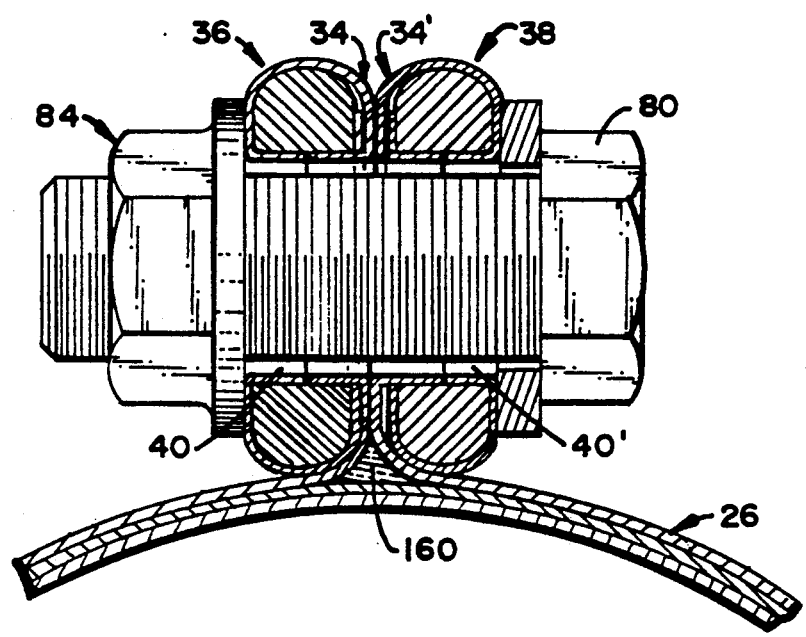

FIGS. 5A and 5B show the clamp 24 in accordance with the present invention as wrapped around the pipes to be joined, 200 and 202. The metal band 26 of clamp 24 is wrapped around the region where the pipes meet or overlap. The ends of the clamp 36 and 38 are brought together by securing bolts 80 and 82 and securing nuts 84 and 86. A gasket 160 is shown. Bolt 80 is secured in holes 40 and 40' and tightened into the nut 84 as shown. Bolt 82 is secured in its corresponding holes (42, 42' in FIG. 2B) with nut 84 in a similar manner. This tightening process causes the metal band 26 to stretch. In the preferred embodiment, the metal band circumferentially stretches beyond its yield point to a greater degree over the section of the pipes to be joined which has a greater diameter.

Figure 6A:
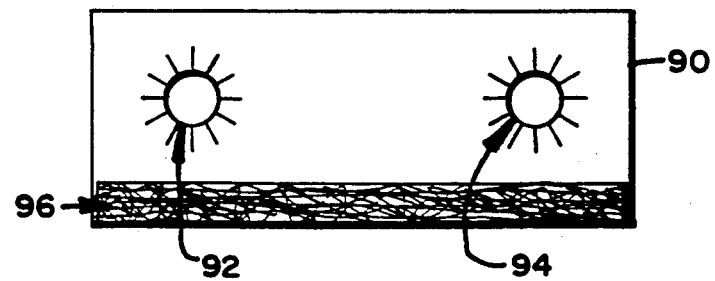
FIG. 6A is an enlarged view of a bolt-securing plate for a metal band clamp.

An alternative embodiment in accordance with the present invention is shown in FIGS. 6A–6C. FIG. 6A shows a plate 90 having dimensions slightly smaller than the dimensions of reinforcing bars 28 and 28' but of substantially similar shape. The plate 90 has bolt-securing holes 92 and 94 having substantially equal diameters. This diameter is typically slightly smaller than the diameter of the formed holes formed in clamp 24. The diameter of the bolt securing holes is selected such that when bolt 80 is inserted into formed hole 40 and encounters plate 90, the bolt will thread into hole 92 of plate 90. This secured threading of the plate on the opposite side of the head of the bolt will secure the bolt in place. The bolt securing plate may also have gasket means 96, such as a foil or other material, to seal the clamp once it is installed. This gasket may be attached to the plate by a staple or other suitable attaching means. The opposite end of the clamp will have nuts 98 and 100 secured in the holes formed in the reinforcing bar 28 at that end of the clamp. With the use of these nuts, forming from both sides of the reinforcing bar is not necessary, although in the preferred embodiment forming the metal band from one side of the reinforcing bar into the hole formed by the reinforcing bar is desired for reasons similar to those described above for forming in the embodiment not having secured nuts. Thus, in the embodiment shown in FIGS. 6A–6C, all parts used by the clamp when sealed are attached rather than separated, easing installation of the clamp.

Other embodiments, such as the use of half-carriage bolts 210, may also be utilized for ease of installation, since only one wrench is needed to install the clamp. Such bolts may be inserted into round or D-shaped holes 212 and 214 formed in the reinforced ends of clamp 24, as shown in FIG. 7. The use of such bolts may also reduce the number of installation tools or steps needed to install the clamps.

Figure 8A:
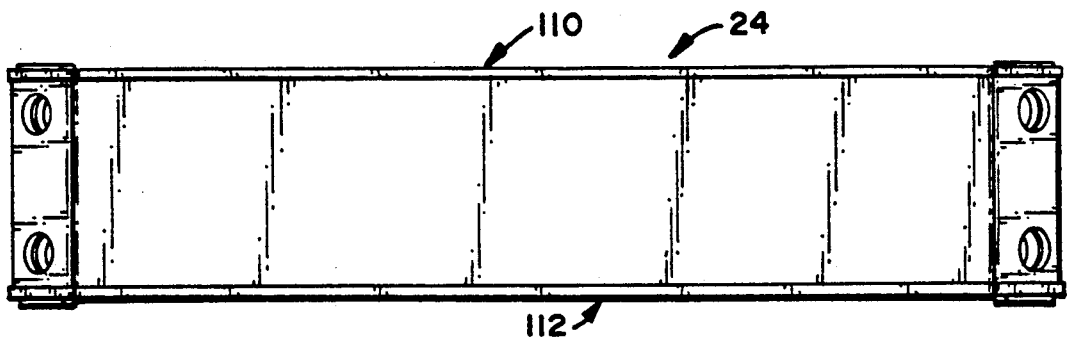
FIG. 8A is a side elevational view of a metal band clamp having a hemmed edge, or rim.
Figure 8B:
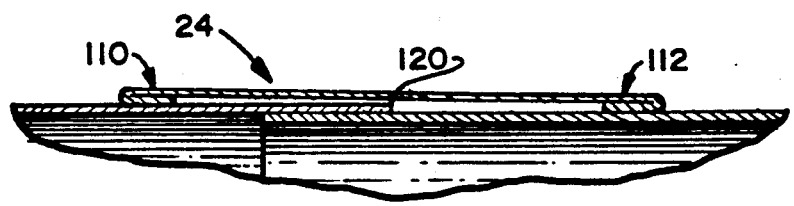
FIG. 8B is a cross-sectional view of a clamp having a hemmed edge or rim prior to securing on a pair of tubular members.

FIGS. 8A and 8B shown another embodiment in accordance with the present invention including hemmed edges 110 and 112. In use, the clamp 24 having the edges 110 and 112 is installed with the edges facing inward towards the pipes to be joined. The edges will contact the pipe more closely than the other portions of the metal band. The edges will contribute to separating the rest of the metal band from the pipes to be joined, reducing friction on these other areas and thus the torque necessary to install the clamp. The presence of the hemmed edge reduces the stress elsewhere along the band, including at the high-stress point 120 in FIG. 8B. The rimmed edges of the band will face relatively higher forces, but stress is reduced in these edges as a result of the doubling of the metal band along the edges. The band is also less susceptible to stress factors since the effective outer edge of the band is a smooth, hemmed surface rather than a cut edge of metal which is more likely to have burrs and other imperfections. The hemmed edge is also aesthetically preferable to an unhemmed edge.

Moreover, because the edges will raise the metal band above the pipes to be joined, less stress will be applied to the pipe having a larger diameter. The reduced stress at the higher stress point, designated as 120 in FIG. 8B, will also ease the installation of the clamp and reduce the tendency to pinch the metal. Finally, the uncoated edges of the metal band will be folded inside of the clamp when in use, thus protecting these uncoated edges from corrosion and visually shielding corrosion which does occur.

Figure 9A:
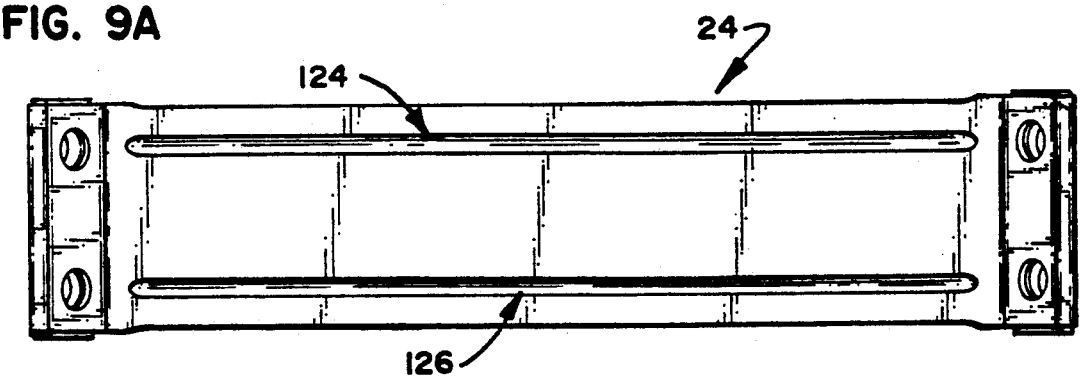
FIGS. 9A and 9B are side elevational and top plan views of a beaded metal band clamp.
Figure 9B:
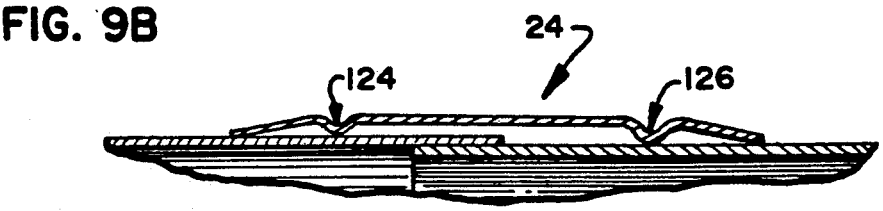

An alternative embodiment having many of the same advantages of the rimmed band is shown in FIGS. 9A and 9B. FIGS. 9A and 9B show beaded sections 124 and 126 running parallel to the longitudinal axis of metal band clamp 24. The beaded areas will project inward towards the pipes to be sealed when the clamp is in use. Like the rimmed embodiment, the beaded embodiment is easier to install because there is less friction across the majority of the metal band. In this case, the friction is focused on the beaded areas 124 and 126 and thus away from the nonbeaded areas. The beaded-band embodiment has the advantage of incorporating less material than the double-edged clamp and being somewhat easier to fabricate than the rimmed construction.

Figure 10A:
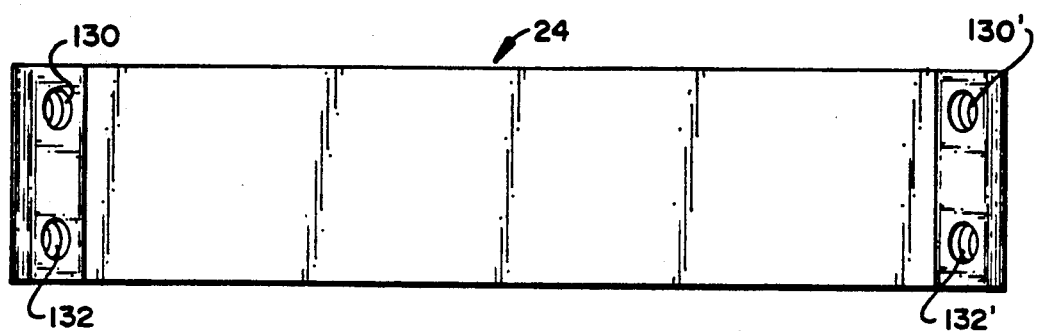
FIGS. 10A and 10B are side elevational and top plan views of a metal band clamp having wrapped ends without reinforcing bars.
Figure 10B:

Another embodiment in accordance with the present invention is shown in FIGS. 10A and 10B. In this configuration, no reinforcing bar is used, saving parts. Instead, the clamp is reinforced by successive wraps 140 and 140' of the ends of the metal band forming the clamp. As shown in FIG. 10B, approximately five complete wraps, creating nine layers of metal band, is an appropriate number of thicknesses to use. However, it is within the spirit of the invention to use greater or fewer wraps to achieve the purposes of the invention. After the ends of the bands are wrapped, the holes 130, 130', and 132, and 132' are formed through the wrappings. It is preferred to form at least one of the wrapping layers into the punched holes. The holes are aligned such that holes 130 and 130' may receive a bolt and nut system to secure the clamp in place. Holes 132 and 132' are aligned in a similar manner.

The invention as described will substantially reduce the installation forces necessary to secure the clamp. Since this clamp may be made with metals having lower yield points, such as aluminized steel, reduced forces may be used to obtain the circumferential stretching used for clamps such as the clamp disclosed in the Hiemstra U.S. Pat. No. Re. 30,042 which utilize circumferential stretching of a clamp beyond its yield point. Such reduced forces permit the use of fasteners which can withstand a smaller range of forces than the fasteners required for clamps requiring higher installation forces. This will provide a further savings in the cost of producing the clamp. These lower installation forces are also less burdensome on the person installing the clamp. Thinner, less costly reinforcing bars may be used as well.

Another advantage of the wrap-around feature of the present invention is that it reduces the stress at the highly stressed corners of the clamp. Typically, the high stress at such locations will be primarily extended to the wraps of the metal band. However, the rounded corners of the reinforcing bar, increased radius of the reinforcing bar edges created by the additional wraps, and protection of the outer wraps from the reinforcing bars cushion the metal band at this location. The reduced reliance on welding also reduces the number of concentrated high-stress points which may give rise to breaking or tearing. While welding may be used, it is not necessary.

Figure 11:
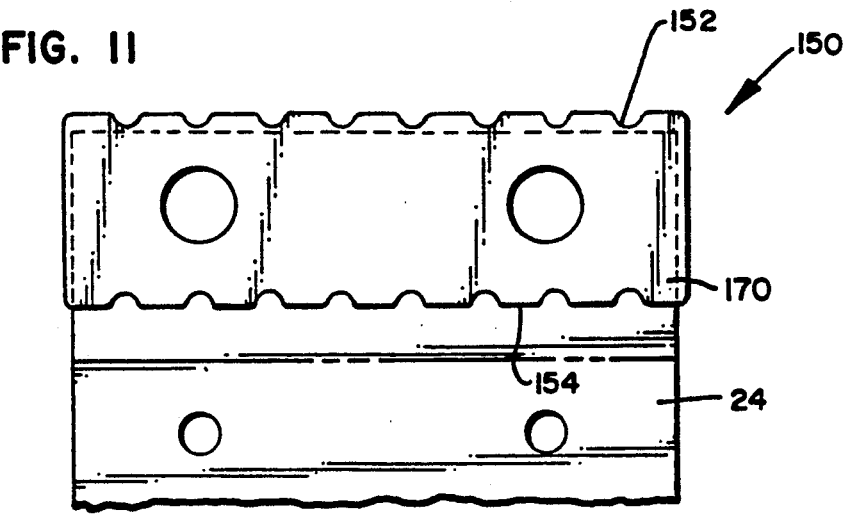
FIG. 11 is a view of an alternative embodiment of a clamp having notched reinforcing bars.

FIG. 11 shows an alternative embodiment of the reinforcing bar used in accordance with the present invention. The bar shown 170 has a series of notches such as notch 152 along its longitudinal edges such as edge 154. The bar is used in a manner similar to the non-notched bar. The notches, when wrapped in the metal band, disperse stress concentrations in the metal band, reducing stress in relatively higher stress areas. This reduced stress has advantages similar to those pointed out elsewhere in this application.

The alternative embodiment of the present invention, shown in FIGS. 12A and 12B, comprises a clamp 180 wrapped at its ends as previously described. The clamp is preformed for installing with three substantially semicircular curved sections having effective radii, 182a, 182b, and 184, as shown. The radii 182a and 182b are generally similar to the radii of the circumferences of the tubular members to be joined, for ease of installation.

Although the embodiments shown are the preferred embodiments for the invention, it is within the scope of the invention to use other embodiments such as more or fewer wraps may be used for specific design or manufacturing reasons. The reinforcing bar is shown as rectangular with curved edges, but may also take other forms for various design or manufacturing reasons. Other modifications of the depicted embodiments will be obvious to those skilled in the art in light of the description.

What is claimed is:

1. A clamp for joining two tubular members of dissimilar diameters together and sealing the joint between the two tubular members comprising:
   (a) a pair of substantially rectangular reinforcing bars each having at least one hole formed therein for receiving a securing bolt, each hole located such that each hole and one reinforcing bar is in alignment with a corresponding hole in the other reinforcing bar when the reinforcing bars are in alignment;
   (b) a substantially rectangular band of ductile metal having a longitudinal length greater than the circumference of the tubular members, having a width approximately equal to the length of the reinforcing bars, having ends wrapped more than one turn around each of the reinforcing bars, having at least two holes formed therein, each hole having a diameter less than the diameter of a corresponding hole formed in one of said reinforcing bars, each of said holes located over the corresponding hole formed in one of said reinforcing bars, and having a portion of said band adjacent to at least one of said formed holes formed into the holes formed in the reinforcing bars, wherein the substantially rectangular band further comprises two hemmed longitudinal edges.

2. A clamp for joining two tubular members of dissimilar diameters together and sealing the joint between the two tubular members comprising:
   (a) a pair of substantially rectangular reinforcing bars each having at least one hole formed therein for receiving a securing bolt, each hole located such that each hole and one reinforcing bar is in alignment with a corresponding hole in the other reinforcing bar when the reinforcing bars are in alignment wherein the substantially rectangular reinforcing bars form notches along at least one edge; and
   (b) a substantially rectangular band of ductile metal having a longitudinal length greater than the circumference of the tubular members, having a width approximately equal to the length of the reinforcing bars, having ends wrapped more than one turn around each of the reinforcing bars, having at least two holes formed therein, each hole having a diameter less than the diameter of a corresponding hole formed in one of said reinforcing bars, each of said holes located over the corresponding hole formed in one of said reinforcing bars, and having a portion of said band adjacent to at least one of said formed holes formed into the holes formed in the reinforcing bars.

3. A clamp for joining two tubular members of dissimilar diameters together and sealing the joint between the two tubular members comprising:
   (a) a pair of substantially rectangular reinforcing bars each having at least one hole formed therein for receiving a securing bolt, each hole located such that each hole and one reinforcing bar is in alignment with a corresponding hole in the other reinforcing bar when the reinforcing bars are in alignment;
   (b) a substantially rectangular band of ductile metal having a longitudinal length greater than the circumference of the tubular members, having a width approximately equal to the length of the reinforcing bars, having ends wrapped more than one turn around each of the reinforcing bars, having at least two holes formed therein, each hole having a diameter less than the diameter of a corresponding hole formed in one of said reinforcing bars, each of said holes located over the corresponding hole formed in one of said reinforcing bars, and having a portion of said band adjacent to at least one of said formed holes formed into the holes formed in the reinforcing bars;
   (c) a bolt-securing plate having a pair of holes having a diameter slightly larger than the diameter of the holes formed in the wrapped reinforcing bar and sized for engaging and retainably receiving a bolt inserted through one of the holes formed in the wrapped reinforcing bar to secure the bolt to the clamp; and
   (d) at least one bolt inserted through one of the holes formed in the bolt-securing plate.

4. A clamp in accordance with claim 3 further comprising receiving and securing means mounted within at least one of the holes formed in a first reinforcing bar which is opposite a second reinforcing bar for receiving and securing said bolt inserted through the second reinforcing bar to the first reinforcing bar.

5. A clamp in accordance with claim 3 further comprising gasket means attached to the bolt-securing plate.

6. A clamp for joining two tubular members of dissimilar diameters together and sealing the joint between the two tubular members comprising:
   (a) a pair of substantially rectangular reinforcing bars each having at least one hole formed therein for receiving a securing bolt, each hole located such that each hole and one reinforcing bar is in alignment with a corresponding hole in the other reinforcing bar when the reinforcing bars are in alignment;
   (b) a substantially rectangular band of ductile metal having a longitudinal length greater than the circumference of the tubular members, having a width approximately equal to the length of the reinforcing bars, having ends wrapped more than one turn around each of the reinforcing bars, having at least two holes formed therein, each hole having a diameter less than the diameter of a corresponding hole formed in one of said reinforcing bars, each of said holes located over the corresponding hole formed in one of said reinforcing bars, and having a portion of said band adjacent to at least one of said formed holes formed into the holes formed in the reinforcing bars, wherein the substantially rectangular band of ductile metal forms beading along two lines substantially parallel to the longitudinal axis of the metal band.

7. A clamp for joining two tubular means together and sealing the joint between the two tubular members comprising:
   a) a pair of substantially rectangular reinforcing bars each having at least one hole formed therein for receiving a securing bolt, each hole located such that each hole in one reinforcing bar is in alignment with a corresponding hole in the other reinforcing bar when the reinforcing bars are in alignment;
   b) a substantially rectangular band of ductile metal having a longitudinal length greater than the circumference of the tubular members, having a width approximately equal to the length of the reinforcing bars, having two hemmed longitudinal edges, having ends wrapped more than one turn around each of the reinforcing bars, and having a portion thereof formed into the holes formed by the reinforcing bars.

8. A clamp for joining two tubular members together and sealing the joint between the two tubular members comprising:
   a) a pair of substantially rectangular reinforcing bars each having at least one hole formed therein for receiving a securing bolt, each hole located such that each hole in one reinforcing bar is in alignment with a corresponding hole in the other reinforcing bar when the reinforcing bars are in alignment;
   b) a substantially rectangular band of ductile metal having a longitudinal length greater than the circumference of the tubular members, having a width approximately equal to the length of the reinforcing bars, having beading along two lines substantially parallel to the longitudinal axis of the metal band, having ends wrapped more than one turn around each of the reinforcing bars, and having a portion thereof formed into the holes formed by the reinforcing bars.

* * * * *

UNITED STATES PATENT AND TRADEMARK OFFICE
CERTIFICATE OF CORRECTION

PATENT NO. :   5,116,083
DATED      :   May 26, 1992
INVENTOR(S) :  Gary R. Gillingham et al.

It is certified that error appears in the above-identified patent and that said Letters Patent is hereby corrected as shown below:

Title page,
Abstract, line 6, "hold" should read --hole--

Column 3, line 2, "meal" should read --metal--

Column 3, line 23, delete "and" after the word "bars;"

Column 3, line 60, "is a " should read --a is--

Column 4, line 19, "option" should read --options--

Column 4, line 43, "wand" should read --band--

Column 6, line 31, "shown" should read --show--

Column 8, line 8, insert --at the ends of the metal band. Varying numbers of wraps-- after the word "wraps"

Column 9, line 26, "larger" should read --smaller--

Signed and Sealed this

Twelfth Day of October, 1993

Attest:

BRUCE LEHMAN

Attesting Officer    Commissioner of Patents and Trademarks